E. A. BALDWIN.
ART OF SELECTING GRADES OF LUBRICANTS FOR INTERNAL COMBUSTION ENGINES.
APPLICATION FILED JAN. 10, 1920.
1,359,147.  Patented Nov. 16, 1920.
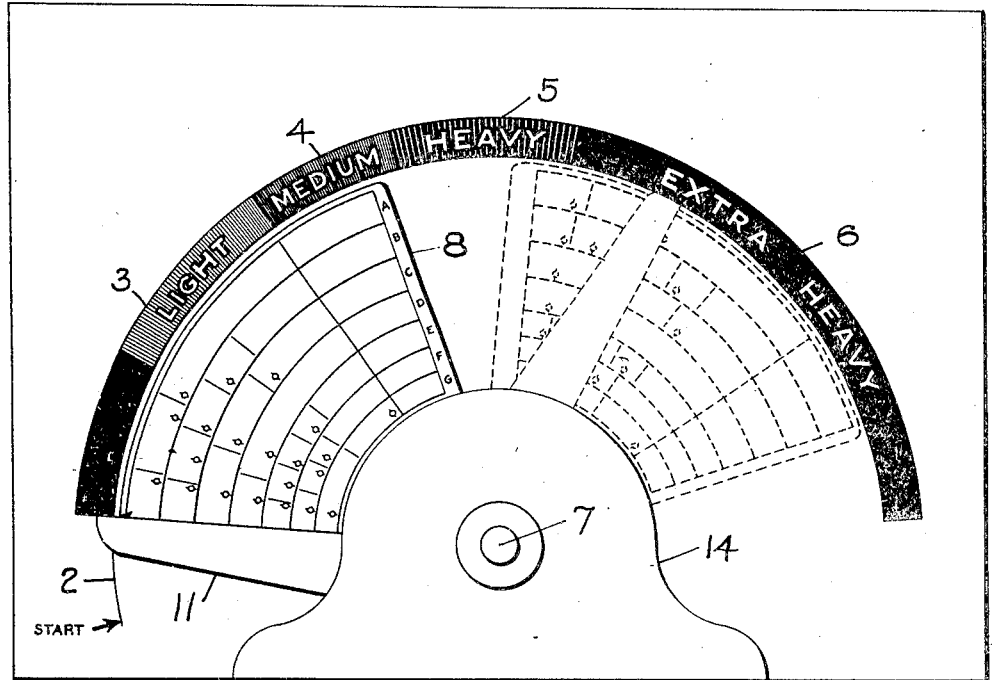
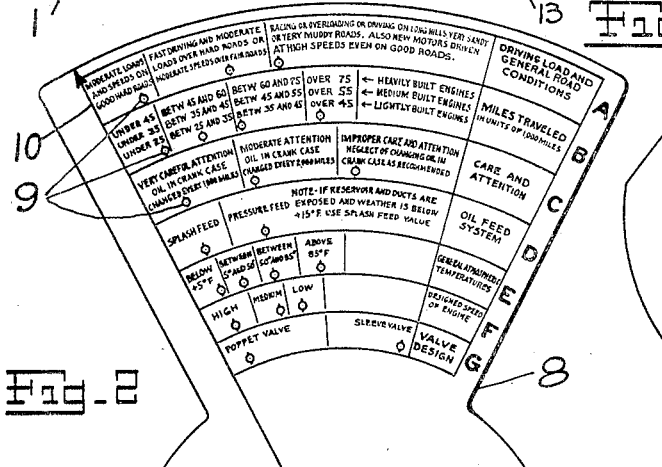
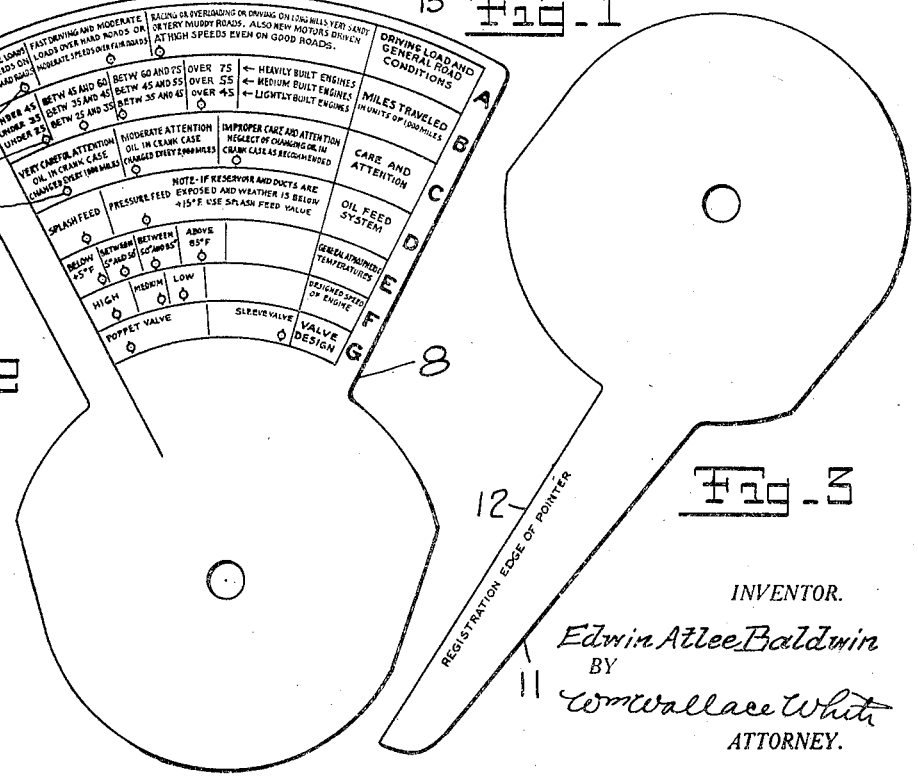
INVENTOR.
Edwin Atlee Baldwin
BY
Wm Wallace White
ATTORNEY.

UNITED STATES PATENT OFFICE.

EDWIN ATLEE BALDWIN, OF NEW YORK, N. Y., ASSIGNOR TO STANDARD OIL COMPANY OF NEW YORK, OF NEW YORK, N. Y., A CORPORATION OF NEW YORK.

ART OF SELECTING GRADES OF LUBRICANTS FOR INTERNAL-COMBUSTION ENGINES.

1,359,147.  Specification of Letters Patent.  Patented Nov. 16, 1920.

Application filed January 10, 1920. Serial No. 350,642.

*To all whom it may concern:*

Be it known that I, EDWIN ATLEE BALDWIN, a citizen of the United States of America, residing in the city, county, and State of New York, have invented new and useful Improvements in the Art of Selecting Grades of Lubricants for Internal-Combustion Engines, of which the following is a specification.

This invention relates to a method of selecting the proper grade of lubricant for use in any given internal combustion engine or motor, taking into account the constructional features of the engine, and the conditions of use under which it is operated; and also to certain apparatus adapted to be used in the application of the method to particular cases.

The primary object of my invention is to group and arrange the different constructional features of engines and the different conditions of use, and assign values to the individual factors of the groups such that the relations between the factors of the several groups permit of factors being selected from certain groups and combined so as to indicate the exact grade of lubricant which will best suit the particular internal combustion engine in question, for the particular circumstances under which such engine is used.

A further object of my invention is to establish such groups of conditions, and to assign such particular values to the factors of said groups, that the grade of lubricant required may be determined by the addition of appropriate factors selected one from each group.

Still a further object of this invention is to provide an apparatus by means of which the grade of lubricant may be determined mechanically and without resorting to numerical calculation.

Having these general objects in mind, and such specific objects as appear from this specification, this invention consists in the herein described method of determining suitable grades of lubricants for internal combustion engines, and in the apparatus for carrying out this method herein described, illustrated and claimed.

In the accompanying drawings, in which similar reference characters designate corresponding parts in all views, there has been illustrated a preferred embodiment of an apparatus suitable for carrying out this method. In these drawings—

Figure 1 is a general view of the apparatus;

Fig. 2 is a detail of the chart, and Fig. 3 is a detail of the pointer.

Heretofore it has been customary for manufacturers of internal combustion engines, and manufacturers of oils, to recommend a particular oil for each given make and model of engine, without taking into consideration the condition of a particular engine, or the sort of care and attention which that engine receives in use, or the general condition of use under which that engine operates.

Applicant has made a careful study of the effect of all the different factors affecting lubrication of internal combustion engines, particularly as used in automobiles, and finds that these may be satisfactorily grouped into seven groups indicated by the letters A, B, C, D, E, F and G in the right hand margin of the chart shown in Fig. 2, the factors included under each of these groups being indicated briefly in the right hand column of said chart, and being explained in more detail here below. Having determined upon the different groups of factors affecting the grade of oil required, the values of the factors within each group relative to one another, and then values of the groups with relation to each other have been determined largely by study and by experiment and by consideration of the principles set out below under each group heading. The values of these factors have thus been so selected that in any given case the appropriate factor may be selected from each group, and these factors simply added together to give an indication of the required grade of lubricant, the grades of lubricant being designated preferably light, medium, heavy and extra heavy, the heavier grades corresponding with the larger sums of factors. In the accompanying drawings the factors have not been given numerical values, but are represented by lengths of arc measured along a circle the circumference 2 of which corresponds with the band in Fig. 1 containing the indications 3, 4, 5, 6 of the grades of oil.

A study of the operation of thousands of internal combustion engines and motor cars has led to the following conclusions: (In the following it is to be assumed that, when discussing the variations in any one condition of the conditions A to G, the other six conditions remain unchanged.)

*Group A—Driving load and general road conditions.*

A—1: Cars are designed to operate at moderate speeds on fair roads and under moderate loads, i. e. over roads and under loads that will not cause the engine to labor when the car is operated in high gear. Therefore when a motor is operated under such combinations of conditions as are outlined below under *a, b* and *c*, the least viscous oil will give the best results, and the lowest factor of this group is selected.

*a.* Speeds not exceeding 35 miles per hour for high grade pleasure cars (and proportionately lower speeds for the lower priced cars) and speeds not exceeding ten miles per hour for the heaviest commercial cars (and not over twenty miles for the light delivery cars.)

*b.* Operated over good hard roads, i. e. those smoothly paved roads found in cities or in flat or rolling suburban country.

*c.* Carrying loads under rated capacity.

A—2: Vehicles not operated under the ideal conditions as outlined under condition A—1 and yet not operated under the severe conditions as outlined under A—3, require a more viscous oil for the engine than would be required for condition A—1. Second factor of Group A selected for these conditions.

A—3: When the engine is operated under the conditions outlined below under *a, b* and *c,* a more viscous oil is required than when it is operated as outlined under the conditions of A—2, and the third factor is selected.

*a.* Racing, i. e. driving at speed much above normal.

*b.* Driving at a nearly steady rate of speed with commercial vehicles loaded to capacity on long hauls such as inter-city hauling.

*c.* Driving on long hills, sandy or muddy roads or driving on even good roads with vehicles loaded above capacity, conditions requiring nearly constant use of intermediate or low speed gears, this of course resulting in high engine speeds.

*Group B—Miles traveled.*—The longer a motor car engine is run the more viscous should be the oil used, for the reason that wear of the bearing surfaces results from normal use, and it becomes necessary to apply a more viscous oil in order to provide that the correct film of oil may be interposed between the surfaces. The amount of this wear is principally governed by the number of revolutions the engine has made, but is also largely affected by the quality of the material of which the parts are made, and by the quality of the workmanship used in its construction. The factors comprising this group are based on consideration of these points, and are as indicated in the chart, Fig. 2.

*Group C—Care and attention.*—Frequently changing the oil in the crank case of the engine permits the use of a less viscous oil than when it is not frequently changed. This is due to the fact that the longer an oil is in use, the more it becomes thinned out due to gasolene getting into it by passing the piston rings, and to partial distillation which takes place on the under side of the piston head. Therefore to provide against the oil becoming too thin it becomes necessary to apply a more viscous oil to begin with, and the viscosity of the oil to use depends directly upon the frequency of changing the oil in the crank case. This matter is of importance, and reference to the chart Fig. 2 shows that the factors of this group are large relatively to those of the other groups.

*Group D—Oil feed system.*—Motors having splash feed system of lubrication do not permit the use of as viscous an oil as do pressure feed systems. Hence the factors of this group depend upon the type of oil feed system of the motor.

*Group E—General atmospheric temperatures.*—The general atmospheric temperature in which a motor is operated has a direct bearing upon the temperature of the oil in the crank case and as all oils become less viscous as they are heated to a higher temperature, it becomes necessary to apply an oil the viscosity of which is suitable to the atmospheric temperature in which the engine is operated.

*Group F—Designed speed of engine.*—As lubricating practice has determined that high speeds require relatively low viscosity oils, and similarly low speeds require relatively high viscosity oils, the designed speed of the motor must be considered, i. e. its speed when operated under normal load, road and driving conditions, and different factors assigned according to whether the engine is designed as a low, medium or high speed engine.

*Group G—Valve design.*—In common use there are two main types of valves, the sleeve valve and the puppet valve. Engineering practice has developed that the sleeve (slide) valve (Knight type) motor requires the application of a materially more viscous oil than does the usual puppet valve type of motor, hence there is a wide difference between the two factors of this group.

Having reached these conclusions, the method of selecting the proper grade of oil for a particular motor consists in grouping the characteristics of motor and conditions of use as outlined above, selecting from each group the appropriate factors for that particular motor, the factors having been reduced to a common base such that the sum of the said appropriate factors from each group is equivalent to an amount representing the required grade of lubricant, adding said factors selected, and adopting the grade of lubricant corresponding to the sum.

A simple way of carrying out the method is by the use of the apparatus shown in the drawing, in which 1 designates a suitable board having described thereon an arc 2, with subdivisions 3, 4, 5 and 6 indicating respectively light, medium, heavy and extra heavy oil. At the center 7 of this arc there is pivoted a chart member 8 bearing thereon concentric sections for each group, said sections bearing indications of the factors of each of the groups A, B, C, D, E, F and G, the values of the factors being represented by the circles 9, and being measured in degrees of arc from the arrow 10.

Also pivotally mounted for rotation about the point 7 is a pointer 11 having a registration edge 12 by means of which the value of a factor is transferred to the base, or arc 2, along which it is to be laid off in the determination of the required grade of oil.

This device may, if desired, be made of suitable board or heavy paper, in which case it is conveniently made by forming the base 1 with a tab 14 which may be folded at the edge of the base portion along the line 13 over the pointer and chart members after these have been laid against the base, and the parts held in place by a suitable pin or fastener passing through the parts at the point 7.

In using this device the chart 8 is first moved around the point 7 to the left until the arrow 10 of the chart corresponds with the arrow on the board 1 marked "Start." For the given motor and under the conditions under which it is to be used, the factors are then selected from the various groups, preferably commencing with the Group A. Assuming that for Group A it is found that the driving load and general road conditions for the given motor are those described as fast driving and moderate loads over hard roads or moderate speed over fair roads, the pointer 11 is then moved to bring its registration edge 12 over the circle 9 located in the section corresponding to Group A designated by such condition, and the pointer is then held in this position against the board 1 while the chart 8 is moved with respect to the board 1, and the pointer 11 to the right until the arrow 10 of the chart is brought into line with the registration edge 12 of the pointer 11. The appropriate factor of Group B is then selected, for instance if it is a lightly built engine, and has gone less than 25,000 miles, the factor is represented by the first of the circles 9 in Group B, and the chart being held in place against the base 1, the indicator is moved until the registration edge 12 corresponds with the first circle 9 of Group B, whereupon the pointer is held against the base 1 by its outer tip, and the chart 8 is drawn forward until the arrow 10 of the chart 8 corresponds again with the registration edge 12 of the pointer 11.

This procedure is followed for each of the succeeding groups C, D, E, F and G, and the last position of the pointer indicates upon the arc 2 the grade of oil required for the particular engine in question under the particular conditions of use.

Having now described this invention, I claim and desire to secure by United States Letters Patent:

1. The method of determining suitable grades of lubricants for machines which consists in providing an arbitrary scale representing grades of oil, grouping the characteristics of machine construction and conditions of use which affect lubrication, assigning values to the factors affecting each group, selecting appropriate factors one from each group, and adding said factors, the values of said factors being such with relation to said scale that the sum of the factors selected equals a scale designation corresponding to the required grade of oil.

2. A device for determining suitable grades of lubricants for machines comprising a base bearing an arcuate scale having indications of grades of lubricants, a chart pivotally supported at the center of said arc for coöperation therewith, and a pointer similarly supported at the same center, said chart having concentric sections corresponding to groups of factors, and each section bering indications corresponding to the several factors of that group, said factors being arranged for selection one from each group.

3. Means for determining suitable grades of lubricants for machines comprising a scale of grades of lubricants, and a chart of factors affecting the selection of a grade, said factors being arranged in groups for selection and combination of factors one from each group to indicate the required grade.

4. A device for determining suitable grades of lubricants for machines comprising a base member of foldable material having a scale of grades of lubricants, a chart having factors affecting lubrication arranged thereon, an indicator, the base having a portion folded over said chart and indicator, and means passing through said base, chart indicator and folded portion for securing the parts and forming a pivotal support for said chart and indicator.

In testimony whereof I have signed my name to this specification.

EDWIN ATLEE BALDWIN.